(12) United States Patent
Betton et al.

(10) Patent No.: US 10,710,795 B2
(45) Date of Patent: Jul. 14, 2020

(54) GAS DISTRIBUTOR FOR A POWDER PACKAGING INSTALLATION HAVING A REINFORCING MEMBER AND ASSOCIATED INSTALLATION

(71) Applicant: TECHNIP FRANCE, Courbevoie (FR)

(72) Inventors: Fabrice Betton, Lyons (FR); Gael Maschino, Villeurbanne (FR); Christophe Machabert, Genilac (FR)

(73) Assignee: TECHNIP FRANCE, Courbevoie (FR)

( * ) Notice: Subject to any disclaimer, the term of this patent is extended or adjusted under 35 U.S.C. 154(b) by 0 days.

(21) Appl. No.: 16/319,187

(22) PCT Filed: Jul. 19, 2017

(86) PCT No.: PCT/EP2017/068209
§ 371 (c)(1),
(2) Date: Jan. 18, 2019

(87) PCT Pub. No.: WO2018/015423
PCT Pub. Date: Jan. 25, 2018

(65) Prior Publication Data
US 2019/0276227 A1  Sep. 12, 2019

(30) Foreign Application Priority Data
Jul. 20, 2016 (FR) .................................. 16 56915

(51) Int. Cl.
*B65D 88/72* (2006.01)
*B65G 65/40* (2006.01)
*B01F 13/02* (2006.01)

(52) U.S. Cl.
CPC .......... *B65D 88/72* (2013.01); *B01F 13/0283* (2013.01); *B65G 65/40* (2013.01); *B65G 2201/042* (2013.01)

(58) Field of Classification Search
CPC .. B65D 88/72; B65G 65/40; B65G 2201/042; B01F 13/0283
See application file for complete search history.

(56) References Cited

U.S. PATENT DOCUMENTS

| 5,462,351 A * | 10/1995 | Royal | B65D 88/72 222/195 |
| 10,569,953 B2 * | 2/2020 | Oren | B65D 88/26 |
| 2019/0276227 A1 * | 9/2019 | Betton | B65D 88/72 |

FOREIGN PATENT DOCUMENTS

| AU | 7257374 A | 2/1976 |
| CN | 1703264 A | 11/2005 |

(Continued)

OTHER PUBLICATIONS

International Search Report and Written Opinion of the Searching Authority dated Aug. 22, 2017 issued in corresponding International Application No. PCT/EP2017/068209.

(Continued)

*Primary Examiner* — Charles Cooley
(74) *Attorney, Agent, or Firm* — Locke Lord LLP; Alan B. Clement; Peter J. Fallon

(57) ABSTRACT

This gas distributor comprises at least one elongate crosspiece including two side walls, inclined on their upper parts, connected to one another in their respective upper parts and defining a gas circulation housing between them emerging downward. The gas distributor includes at least one reinforcing member arranged in the housing defined in the elongate crosspiece, the reinforcing member including a central vertical plate that extends longitudinally in said housing and at least one bracket fastened transversely between the central vertical plate and the side wall of the elongate crosspiece.

13 Claims, 4 Drawing Sheets

(56) References Cited

FOREIGN PATENT DOCUMENTS

| | | | | |
|---|---|---|---|---|
| DE | 1211545 | B | 2/1966 | |
| DE | 3609244 | A1 * | 9/1987 | .......... B01F 13/0288 |
| EP | 0765286 | A1 | 4/1997 | |
| FR | 2719565 | A1 * | 11/1995 | ............. B65D 88/72 |
| FR | 2720055 | A1 * | 11/1995 | ............. B65D 88/72 |
| GB | 2083009 | A | 3/1982 | |
| GB | 2174372 | A | 11/1986 | |
| JP | 60082532 | A * | 5/1985 | ............. B65D 88/72 |
| TW | 274524 | B | 4/1996 | |
| WO | WO-8100555 | A1 * | 3/1981 | ............. B65D 88/72 |
| WO | WO-95/01293 | A1 | 1/1995 | |

OTHER PUBLICATIONS

Search Report and Written Opinion issued in FR1656915 dated Feb. 7, 2017.

* cited by examiner

GAS DISTRIBUTOR FOR A POWDER PACKAGING INSTALLATION HAVING A REINFORCING MEMBER AND ASSOCIATED INSTALLATION

CROSS-REFERENCE TO RELATED APPLICATIONS

This Application is a U.S. National Stage application under 35 U.S.C. 371 of International Application No. PCT/EP2017/068209, filed on Jul. 19, 2017, which claims the benefit of and priority to French Application No. FR 1656915 filed on Jul. 20, 2016. The entire contents of these applications are hereby incorporated by reference in their entirety.

BACKGROUND OF THE INVENTION

Field of the Invention

The present invention relates to a gas distributor for a powder packaging installation, comprising at least one elongate crosspiece including two side walls, inclined on their upper parts, connected to one another in their respective upper edges and defining a gas circulation housing between them emerging downward.

Description of Related Art

Such a gas distributor is intended in particular to equip installations for packaging solid particles in bulk or powders. The solid particles are for example polyethylene or polypropylene granules. The powders are for example polyethylene or polypropylene powder.

The powder intended to circulate in such an installation retains moisture or liquid hydrocarbons and tends to form clumps or even compact blocks, such that the flow of powder does not flow fluidly in the installation. Furthermore, the hydrocarbons must be eliminated to guarantee the quality of the end product. To offset this problem, dry gas is injected inside the installation to dry the powder and thus fluidify the circulation of the powder in the installation.

EP 0,705,206 describes a powder packaging installation comprising a circulation hopper for the powder. The hopper is equipped in its central part with a gas distributor. The gas distributor includes a structure mounted transversely in the hopper and formed by inclined walls to promote the circulation of the powder. The gas is injected into the space located below the inclined walls and mixes with the powder. In this way, the circulation of the gases is not prevented by the powder that descends into the installation and slides over the inclined walls.

However, such a structure is not always strong enough to bear the weight of the stream of powder, in particular over time.

One aim of the invention is therefore to provide a structure of the gas distributor that is more robust over time, while guaranteeing a good circulation of the gas stream.

BRIEF SUMMARY OF THE INVENTION

To that end, the invention relates to a gas distributor of the aforementioned type, characterized in that the gas distributor includes at least one reinforcing member arranged in the housing defined in the elongate crosspiece, the reinforcing member including a central vertical plate that extends longitudinally in said housing and at least one bracket fastened transversely between the central vertical plate and the side wall of the elongate crosspiece.

The gas distributor according to the invention may comprise one or more of the following features, considered alone or according to any technically possible combination(s):

- the reinforcing member comprises a lower longitudinal plate that extends horizontally to close the housing downwardly;
- the lower longitudinal plate has at least one vertical through hole;
- two elongate crosspieces arranged crossed, each including a reinforcing member provided with a central vertical plate and at least one bracket;
- three elongate crosspieces arranged crossed, each including a reinforcing member provided with a central vertical plate and at least one bracket;
- the central vertical plate of the reinforcing member has a horizontal through hole;
- an upper edge of the central vertical plate is attached at the coupling between the inclined upper parts of the side walls;
- a side edge of the bracket is fastened on an inner surface of the side wall defining the housing;
- the central vertical plate defines two longitudinal and opposite compartments in the housing, the reinforcing member including at least one bracket in each compartment;
- the reinforcing member includes several brackets distributed in each compartment;
- the bracket includes a through passage, the surface area of which represents at least 15% of the total surface area of the bracket; and
- a lower peripheral plate that extends horizontally on the periphery of a central aperture, the elongate crosspiece extending through the central aperture.

The invention also relates to a powder conditioning installation, comprising:
- an enclosure having at least one side wall that converges downward,
- a gas distributor as defined above, interposed in the enclosure, and
- at least one gas intake pipe emerging in the housing of the elongate crosspiece.

BRIEF DESCRIPTION OF THE SEVERAL VIEWS OF THE DRAWINGS

The invention will be better understood upon reading the following description, provided solely as an example, and in reference to the appended drawings, in which.

DETAILED DESCRIPTION OF THE INVENTION

Figure 1:
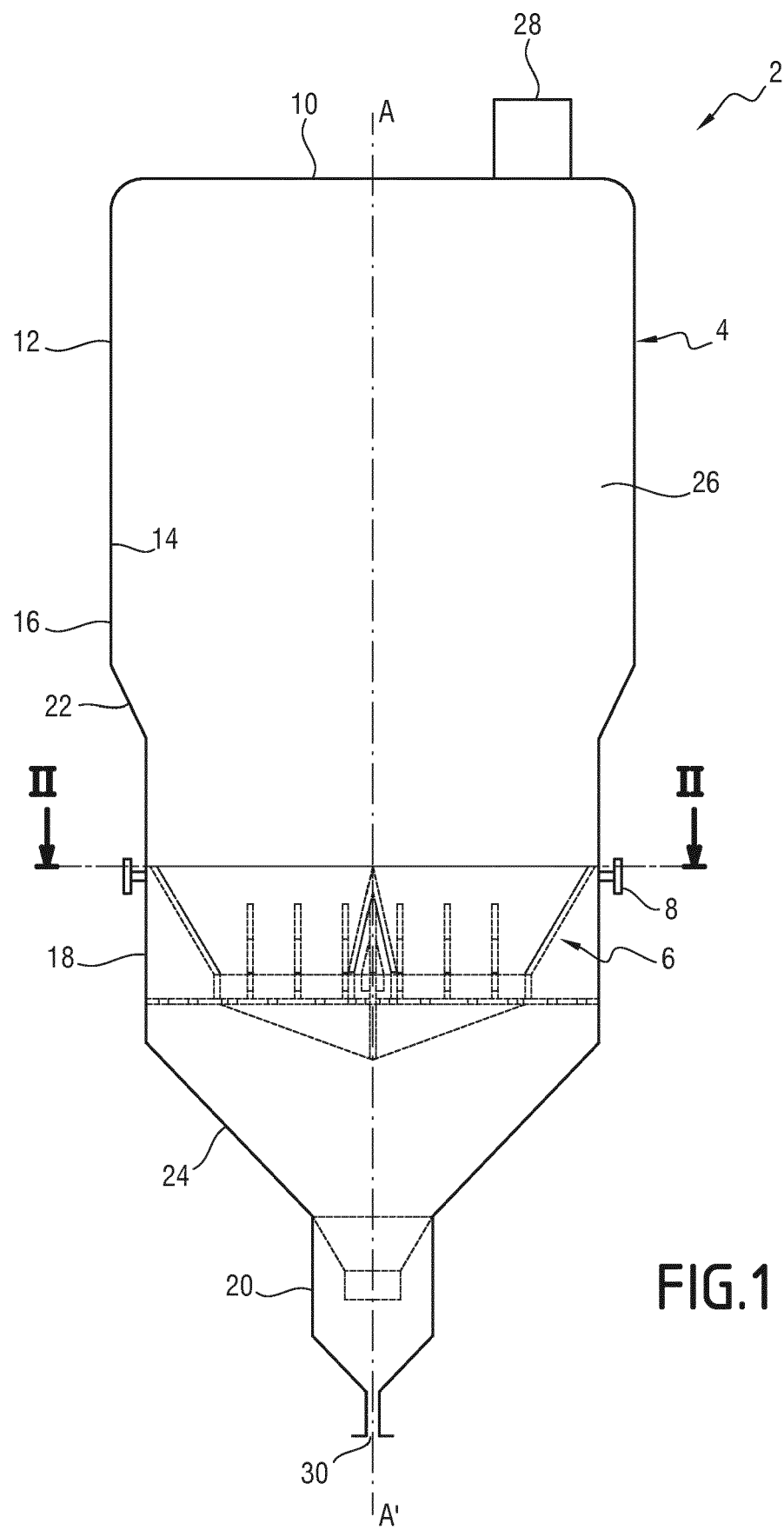
FIG. 1 is a schematic view of a packaging installation including a gas distributor according to the invention.

A packaging installation 2, capable of containing powder or particles in bulk, is illustrated in FIG. 1.

The packaging installation 2 includes an enclosure 4, a gas distributor 6 interposed in the enclosure 4 and a gas intake pipe 8 emerging in the gas distributor 6.

Hereinafter, the terms "upstream" and "downstream" are to be understood relative to the normal flow direction of the powder in the packaging installation 2.

The enclosure 4 has a generally cylindrical shape. It comprises an upper wall 10 and a side wall 12 that converge downstream, downwardly.

Advantageously, the upper wall 10 has a curved bottom.

The side wall 12 has an inner surface 14 in contact with the powder, defining a passage volume 26 of the powder.

In the illustrated example, and advantageously, the side wall 12 has an upper vertical part 16, an intermediate vertical part 18 and a lower vertical part 20. It also has an upper converging part 22 placed between the upper vertical part 16 and the intermediate vertical part 18 and a lower converging part 24 placed between the intermediate vertical part 18 and the lower vertical part 20. The side wall 12 here converges by plateaus.

The expressions "upper", "intermediate" and "lower" correspond to the positioning levels relative to the vertical, and in the circulation direction of the powder in the packaging installation 2.

The enclosure 4 defines a passage 26 and/or storage volume of the powder.

Advantageously, the enclosure 4 has a diameter greater than 3 meters so as to receive a large quantity of powder in the passage volume 26.

The enclosure 4 has, upstream in the circulation direction of the product or the powder, an inlet opening 28 housed in its upper wall 10, by which the powder enters the passage volume 26 of the packaging installation 2.

It also has, downstream, an outlet opening 30, by which the powder escapes from the packaging installation 2.

Advantageously, the outlet opening 30 has a smaller diameter, in particular between 4 times and 20 times smaller relative to the largest diameter of the enclosure 4.

The gas distributor 6 is arranged in the passage volume 26. It is fastened on the inner surface 14 of the side wall 12 of the enclosure 4, here on the intermediate vertical part 18.

Figure 2:
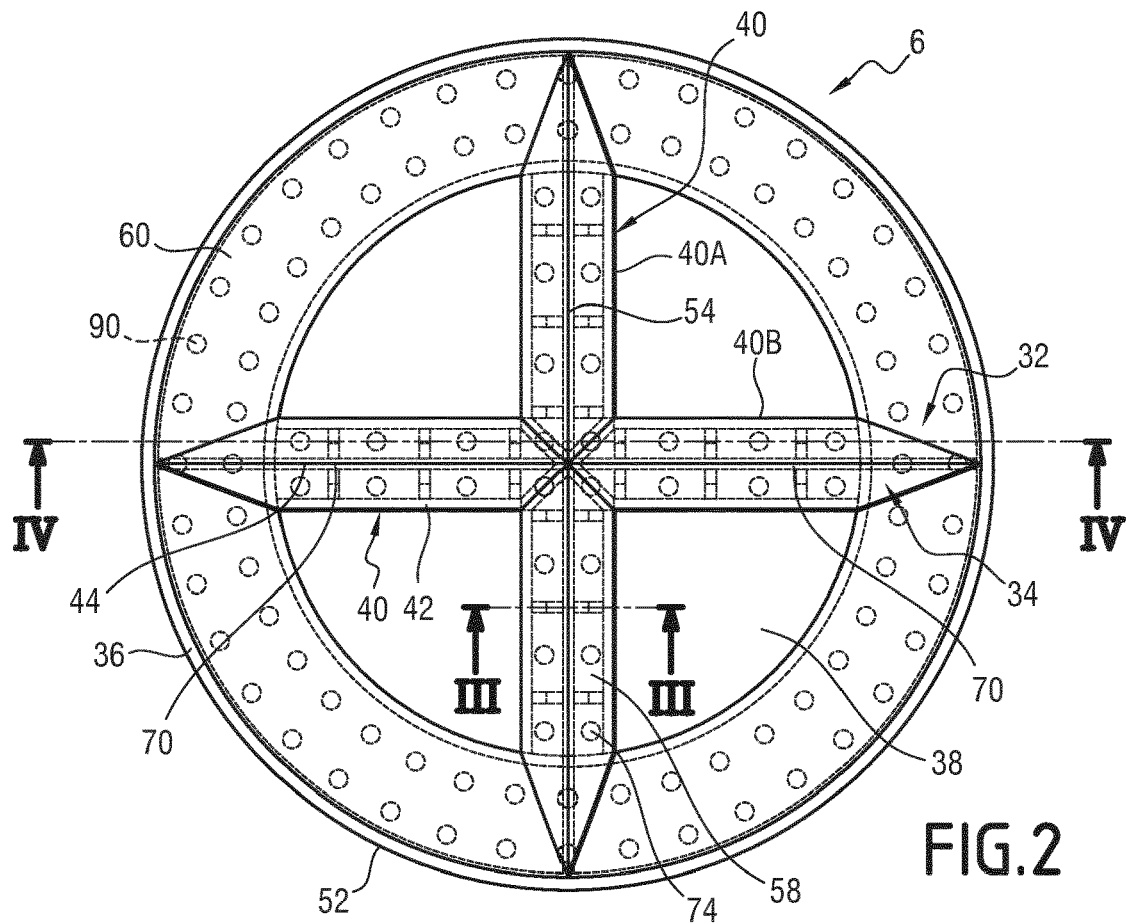
FIG. 2 is a sectional view along plane II of FIG. 1, of the gas distributor according to the invention.
Figure 3:
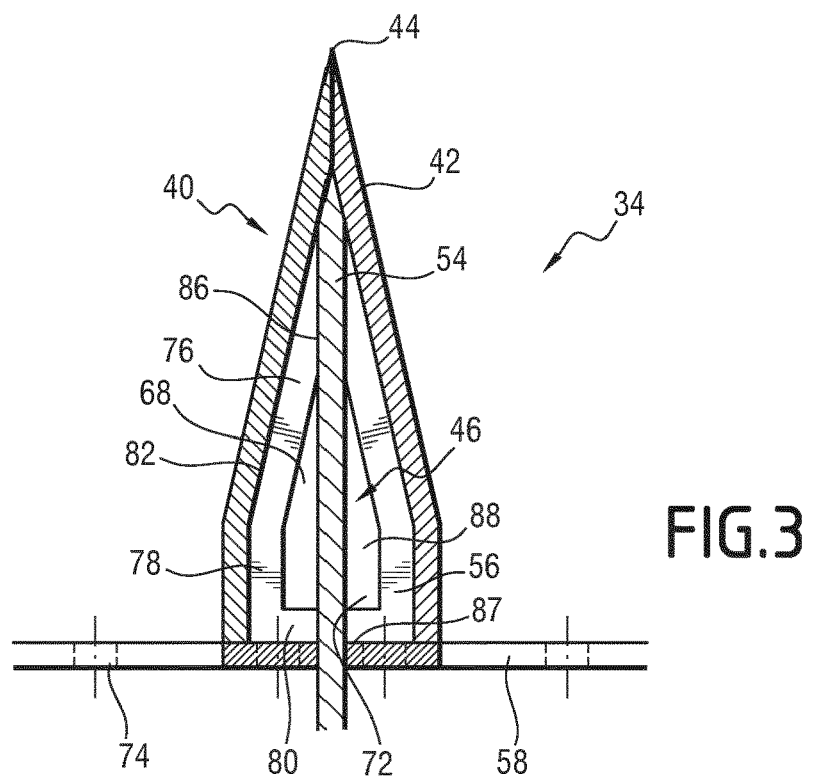
FIG. 3 is a partial sectional view along plane III of FIG. 2.
Figure 4:
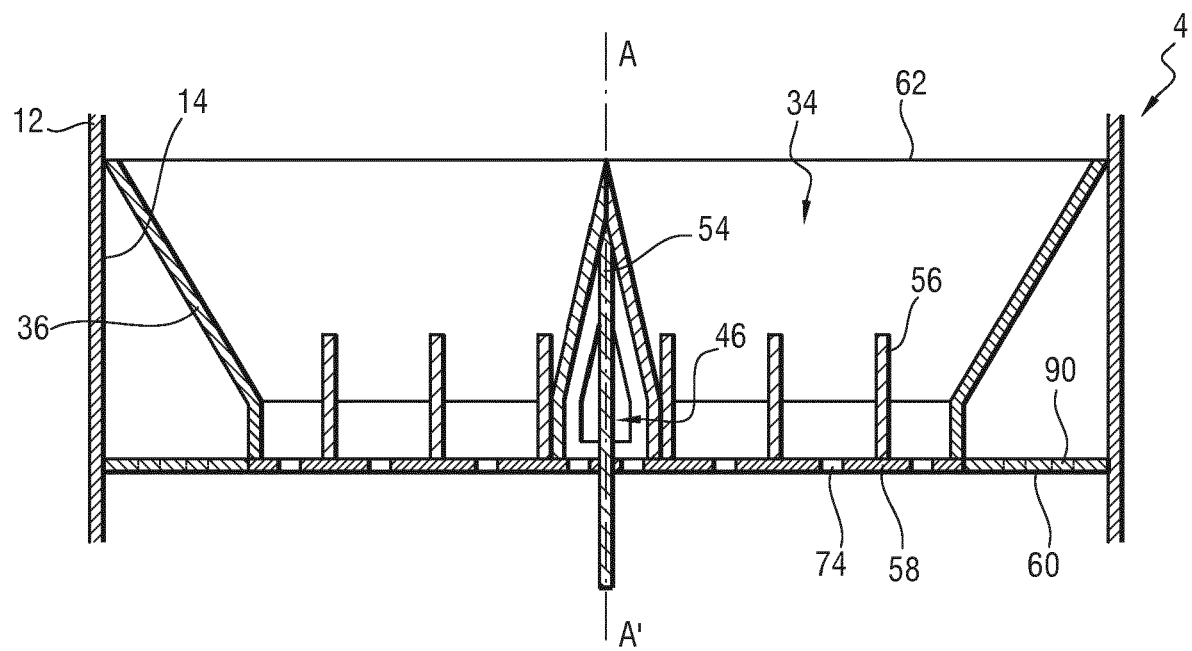
FIG. 4 is a partial sectional view along plane IV of FIG. 2.

As illustrated in FIGS. 2, 3 and 4, the gas distributor 6 comprises a support 32 and at least one reinforcing member 34 housed in the support 32.

The support 32 comprises a circular peripheral plate 36 defining a central aperture 38 for the passage of powder, and at least one elongate crosspiece 40.

The elongate crosspiece 40 extends through the central aperture 38 defined by the circular peripheral plate 36, here along a diameter of the packaging installation 2.

As illustrated in FIG. 3, the elongate crosspiece 40 includes two side walls 42 inclined over their upper parts and connected to one another at their respective upper edges 44. The side walls 42 thus have a cross-section in the general shape of an inverted V. In this way, the powder that flows in the passage volume 26 of the packaging installation 2 slides over the inclined upper parts of the side walls 42.

The two side walls 42 define a lower gas circulation housing 46 between them emerging downwardly.

Advantageously and as illustrated in FIG. 2, the support 32 includes a first elongate crosspiece 40A and a second elongate crosspiece 40B.

The first and second elongate crosspieces 40A, 40B pass through the central aperture 38 and are arranged perpendicular to one another.

The circular peripheral plate 36 of the support 32 includes an upper circular edge 52 fastened on the inner surface 14 of the side wall 12 of the enclosure 4.

It is inclined relative to the vertical and converges downward and toward the longitudinal central axis A-A' of the enclosure 4. The powder that flows from the inlet opening 28 toward the outlet opening 30 slides over the circular peripheral plate 36 during its passage at the gas distributor 6.

The reinforcing member 34 is shown in FIGS. 3 and 4. It is arranged in the housing 46 defined in the elongate crosspiece 40.

According to the invention, it includes a central vertical plate 54, at least one bracket 56 fastened transversely between the central vertical plate 54 and the side wall 42 of the elongate crosspiece 40, and advantageously at least one lower longitudinal plate 58 to close the housing 46 downwardly. The reinforcing member 34 may also include a lower peripheral plate 60.

The central vertical plate 54 extends longitudinally in the housing 46 defined between the side walls 42 of the elongate crosspiece 40, to reinforce the structure of the support 32.

The central vertical plate 54 has a thickness advantageously of between 2 mm and 32 mm.

The central vertical plate 54 defines two opposite and substantially equal longitudinal compartments 68 in the housing 46, located on either side of the central vertical plate 54.

Figure 5:
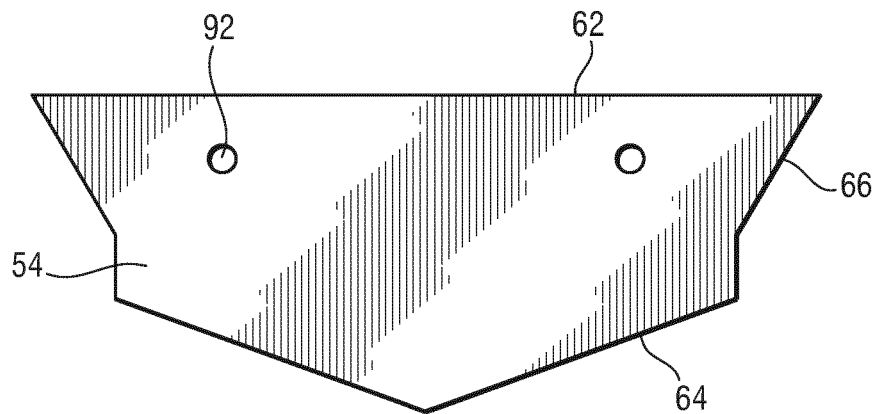
FIG. 5 is a schematic view of a vertical plate according to one embodiment.

As illustrated by FIG. 5, the central vertical plate 54 includes, in elevation, a straight upper edge 62, a V-shaped lower edge 64 that converges downward, and two symmetrical side edges 66 relative to the vertical axis and provided with a beveled upper part.

Advantageously, the straight upper edge 62 is welded at the coupling between the inclined upper parts of the side walls 42 of the elongate crosspiece 40.

The lower edge 64 extends below the lower part of the gas distributor 6. It forms an angle with the horizontal of between 5° and 22°, for example 15°.

Advantageously, the central vertical plate 54 extends over the entire length of the first elongate crosspiece 40A. In the second elongate crosspiece 40B, two central vertical half-plates 70, illustrated in FIG. 6, each extend over a respective half-length of the second elongate crosspiece 40B.

The two central vertical half-plates 70 are fastened perpendicularly on the central part of the central vertical plate 54.

The lower longitudinal plate 58 extends horizontally to close, downwardly, the compartment 68 defined between the side wall 42 of the elongate crosspiece 40 and the central vertical plate 54.

The lower longitudinal plate 58 advantageously has a thickness of between 5 mm and 25 mm.

It extends over the entire length of the elongate crosspiece 40 and upwardly defines a receiving volume 72 for the gases, capable of receiving the gases coming from the gas intake pipe 8, with the central vertical plate 54 and the side wall 42 of the elongate crosspiece 40.

Advantageously, the lower longitudinal plate 58 has at least one vertical through hole 74 for gas distribution. In this way, the gases present in the receiving volume 72 escape downward through the vertical through hole 74.

The vertical through hole 74 has a diameter advantageously of between 25% and 50% of the width of the lower longitudinal plate 58.

Preferably, the lower longitudinal plate 58 is provided with several vertical through holes 74 distributed over the entire length of the lower longitudinal plate 58, for example at least 20 vertical through holes 74 per square meter.

In the illustrated example, the lower longitudinal plate 58 includes, for each compartment 68, at least four vertical through holes 74, here eight vertical through holes 74 distributed uniformly over a longitudinal row. This configuration provides a good distribution of the gases in the packaging installation 2.

The minimum distance between the respective axes of each through hole 74 is equal to 1.2 times the diameter of the through hole 74. For example, the distance separating the respective axes of two consecutive through holes 74 is 1.25 times the diameter of the through hole 74.

The bracket 56 is shown in FIG. 3. It is mounted fixed and is arranged transversely between the central vertical plate 54 and the side wall 42 of the elongate crosspiece 40.

The bracket 56 has a thickness advantageously of between 5 mm and 25 mm.

The bracket 56 includes an inclined upper portion 76, a vertical intermediate portion 78 and a horizontal lower portion 80. It adapts to the shape of the housing 46 defined by the elongate crosspiece 40.

The bracket 56 includes a side edge 82 fastened on an inner surface of the side wall 42, an opposite side edge 86 fastened on the central vertical plate 54, and a lower edge 87 fastened on the lower longitudinal plate 58.

The bracket 56 includes a through passage 88 opposite the central vertical plate 54, intended for the circulation of the gas stream passing through the gas distributor 6.

Advantageously, the through passage 88 has a surface area representing at least 15% of the total surface area of the bracket 56.

Preferably, the reinforcing member 34 includes several parallel brackets 56 distributed in each compartment 68, over the length of the compartment 68.

In the illustrated example, each compartment 68 of the elongate crosspiece 40 includes six brackets 56, distributed over the entire length of the elongate crosspiece 40.

Preferably, the respective brackets 56 of each compartment 68 are arranged symmetrically across from one another, on either side of the central vertical plate 54.

Advantageously, each elongate crosspiece 40 includes a reinforcing member 34 provided with a central vertical plate 54, several brackets 56 and two lower longitudinal plates 58.

Figure 7:
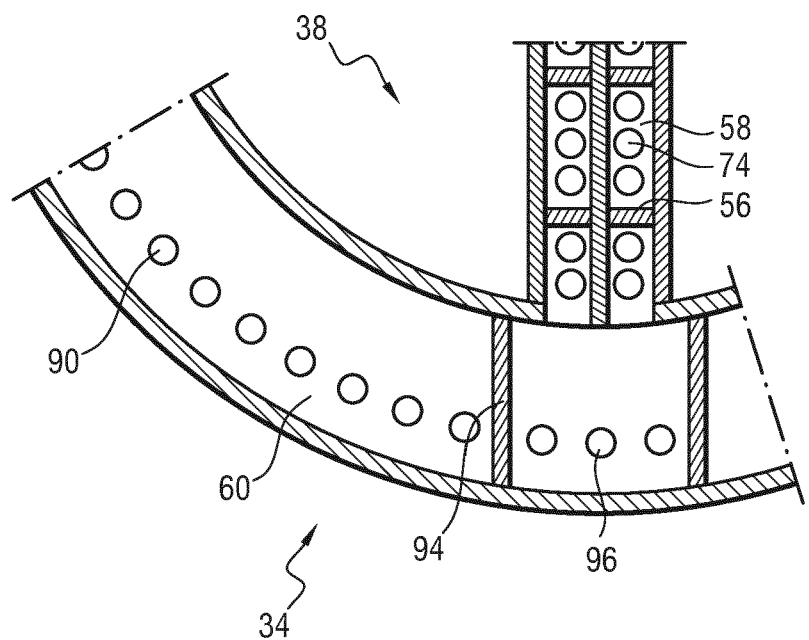
FIG. 7 is a detailed partial view of the reinforcing member of the gas distributor of FIG. 2.

As shown in FIGS. 2 and 7, the lower peripheral plate 60 extends horizontally on the periphery of the central aperture 38.

The lower peripheral plate 60 is circular. It is fastened at its periphery on the inner surface 14 of the enclosure 4.

The lower peripheral plate 60 has a thickness advantageously of between 5 mm and 25 mm.

Advantageously, the lower peripheral plate 60 has at least one vertical through hole 90 to promote the distribution and apportionment of the gas downward.

The vertical through hole 90 advantageously has a diameter of between 25% and 50% of the width of the lower peripheral plate 60.

The central vertical plate 54, the lower longitudinal plate 58, the bracket 56 and the lower peripheral plate 60 are preferably made from steel, in particular carbon steel or stainless steel.

The gas intake pipe 8 illustrated in FIG. 1 emerges in the housing 46 of the elongate crosspiece 40, through one or several orifices arranged in the side wall 12 of the packaging installation 2.

Advantageously, four orifices are arranged in the side wall 12 of the packaging installation 2, such that the respective ends of the two elongate crosspieces 40 are capable of receiving gas through the gas intake pipe 8.

The operation of the packaging installation 2 will now be described.

First, the powder is introduced into the passage volume 26 of the packaging installation 2, through the inlet opening 28.

The powder next flows to the inclined upper part of the side walls 42 of the elongate crosspieces 40. It then flows along the side walls 42.

The gas intake pipe 8 conveys gas from an outside source to the housing 46.

The gas then circulates in each compartment 68 defined between the central vertical plate 54, the elongate crosspieces 40 and the lower longitudinal plate 58, while being distributed in the compartment 68, through the through passage 88 of each of the brackets 56.

The gases then pass through the vertical through holes 74 of the lower longitudinal plate 58 and thus penetrate the passage volume 26 of the packaging installation 2. This makes it possible to reduce the hydrocarbons such that the powder reaches the required quality.

The gases then come into contact with the powder contained in the enclosure 4. Thus, the gases dry the powder such that it flows fluidly into the packaging installation 2.

According to one alternative embodiment, the packaging installation 2 contains at least two gas distributors 6 located at different heights in the enclosure 4 of the packaging installation 2.

Figure 8:
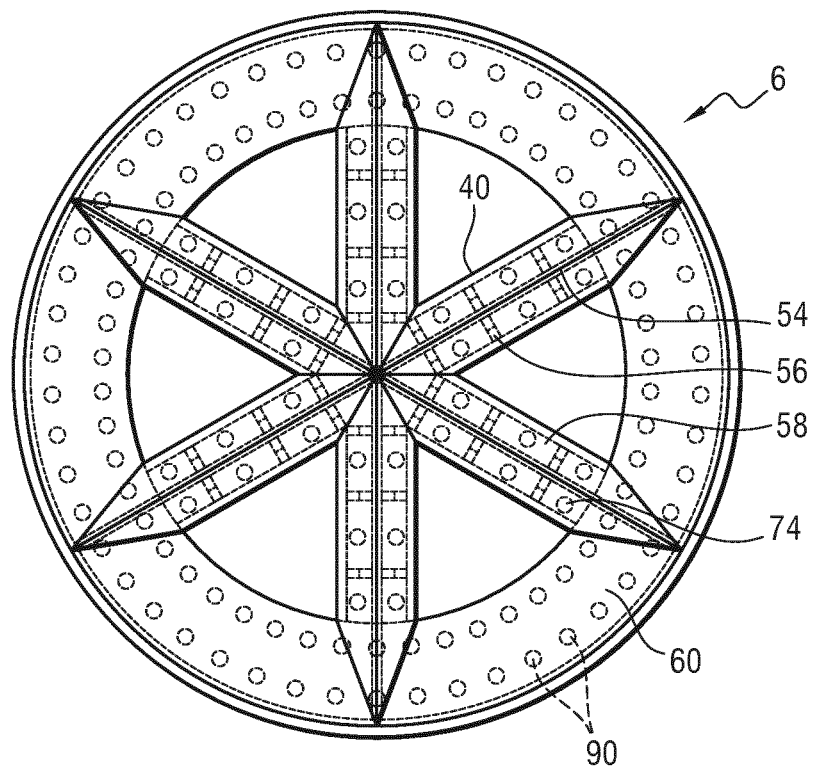
FIG. 8 is a view similar to FIG. 2 according to another embodiment.

According to another embodiment, illustrated in FIG. 8, the gas distributor 6 includes three elongate crosspieces 40 arranged crossed. Each elongate crosspiece 40 includes a reinforcing member 34 provided with a central vertical plate 54 and at least one bracket 56.

Advantageously, each reinforcing member 34 also comprises two lower longitudinal plates 58 provided with vertical through holes 74.

Figure 6:
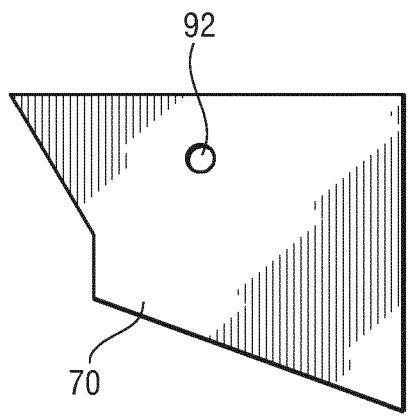
FIG. 6 is a schematic view of a vertical half-plate according to one embodiment.

According to an alternative embodiment illustrated in FIGS. 5 and 6, the central vertical plate 54 and the central vertical half-plates 70 have at least one horizontal through hole 92. In the example of FIG. 6, the central vertical plate has two horizontal through holes 92. In this way, the gases present in the receiving volume 72 circulate between the two compartments 68 of a same elongate crosspiece 40 so as to balance the pressure in the two compartments 68.

According to another embodiment illustrated by FIG. 7, the reinforcing member 34 includes at least one additional reinforcing plate 94. The or each additional reinforcing plate 94 is located parallel to the central vertical plate 54, between the gas distributor 6 and the side wall 12 of the packaging installation 2, below the circular peripheral plate 36.

According to one particular embodiment illustrated in FIG. 7, the lower peripheral plate 60 includes at least one drainage hole 96 located at least at one of the ends of the elongate crosspiece 40.

The drainage hole 96 has a diameter advantageously of between 12 mm and the largest diameter among those of the vertical through holes 74, 90.

In other alternatives, the brackets 56 can be arranged in staggered rows in the two compartments 68, and/or the number of brackets 56 per compartment can be higher, or the number of vertical 74, 90 and horizontal 92 through holes present on the lower longitudinal plate 58, the lower peripheral plate 60 and/or the central vertical plate 54 are different from those shown.

The gas distributor described above is very robust so as to withstand the weight of the powder, while optimizing the circulation of the gas and its homogeneous distribution in the packaging installation.

The invention claimed is:

1. A gas distributor for a powder packaging installation, comprising at least one elongate crosspiece including two side walls, inclined on their upper parts, connected to one another in their respective upper edges and defining a gas circulation housing between them emerging downward, wherein the gas distributor includes at least one reinforcing member arranged in the housing defined in the elongate crosspiece, the reinforcing member including a central vertical plate that extends longitudinally in said housing and at least one bracket fastened transversely between the central vertical plate and one of the side walls of the elongate crosspiece, wherein a side edge of the bracket is fastened on an inner surface of said one of the side walls defining the housing.

2. The gas distributor according to claim 1, wherein the reinforcing member comprises a lower longitudinal plate that extends horizontally to close the housing downwardly.

3. The gas distributor according to claim 2, wherein the lower longitudinal plate has at least one vertical through hole.

4. The gas distributor according to claim 1, comprising two elongate crosspieces arranged crossed, each including a reinforcing member provided with a central vertical plate and at least one bracket.

5. The gas distributor according to claim 1, comprising three elongate crosspieces arranged crossed, each including a reinforcing member provided with a central vertical plate and at least one bracket.

6. The gas distributor according to claim 1, wherein the central vertical plate of the reinforcing member has a horizontal through hole.

7. The gas distributor according to claim 1, wherein an upper edge of the central vertical plate is attached at a coupling between the inclined upper parts of the side walls.

8. The gas distributor according to claim 1, wherein the central vertical plate defines two longitudinal and opposite compartments in the housing, the reinforcing member including at least one bracket in each compartment.

9. The gas distributor according to claim 8, wherein the reinforcing member includes several brackets distributed in each compartment.

10. The gas distributor according to claim 1, wherein the bracket includes a through passage, the surface area of which represents at least 15% of the total surface area of the bracket.

11. The gas distributor according to claim 1, comprising a lower peripheral plate that extends horizontally on the periphery of a central aperture, the elongate crosspiece extending through the central aperture.

12. A powder conditioning installation, comprising:
    an enclosure having at least one side wall that converges downward,
    a gas distributor according to claim 1, interposed in the enclosure, and
    at least one gas intake pipe emerging in the housing of the elongate crosspiece.

13. A gas distributor for a powder packaging installation, comprising at least one elongate crosspiece including two side walls, inclined on their upper parts, connected to one another in their respective upper edges and defining a gas circulation housing between them emerging downward, wherein the gas distributor includes at least one reinforcing member arranged in the housing defined in the elongate crosspiece, the reinforcing member including a central vertical plate that extends longitudinally in said housing and at least one bracket fastened transversely between the central vertical plate and one of the side walls of the elongate crosspiece, wherein an upper edge of the central vertical plate is attached at a coupling between the inclined upper parts of the two side walls.

* * * * *